A. M. LAWRENCE.
HACKSAW BLADE.
APPLICATION FILED NOV. 12, 1920.
1,381,478.
Patented June 14, 1921.
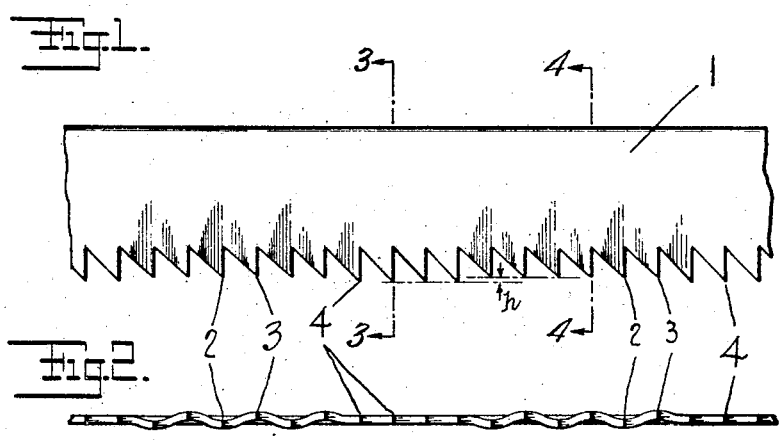
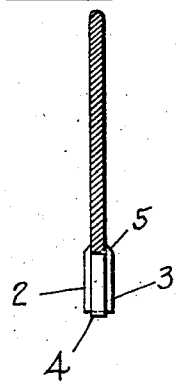
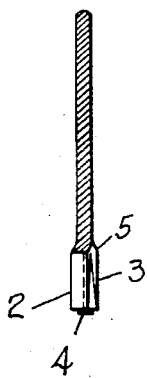
Inventor
Austin M. Lawrence
By his Attorney
Wm Wallace White

UNITED STATES PATENT OFFICE.

AUSTIN M. LAWRENCE, OF MONTAGUE, MASSACHUSETTS.

HACKSAW-BLADE.

1,381,478.   Specification of Letters Patent.   Patented June 14, 1921.

Application filed November 12, 1920. Serial No. 423,567.

*To all whom it may concern:*

Be it known that I, AUSTIN M. LAWRENCE, a citizen of the United States of America, residing at Montague, county of Franklin, Commonwealth of Massachusetts, have invented new and useful Improvements in Hacksaw-Blades, of which the following is a specification.

My invention relates to hack saw blades, and has for its principal object an improvement on the corrugated hack saw blades shown and described in my copending application which has become Patent Number 1,369,178.

While the hack saw described in my said copending application is very much more efficient than the ordinary hack saw, I have found that the speed and ease with which the cut can be made can be still further increased without sacrificing any of the advantages of my said construction by combining with the teeth formed and set as therein described, additional teeth set as shown in the accompanying drawings and herein described.

My invention then consists in the construction, combination and arrangement of parts herein described and claimed, and illustrated in the accompanying drawings.

In these drawings, in which similar reference characters designate corresponding parts in all views, I have shown a preferred embodiment of my invention, and Figure 1 is a side elevation of a hack saw blade embodying the invention;

Fig. 2 is a view of the edge of the blade looking upward at Fig. 1;

Fig. 3 is a section taken approximately on the line 3—3 of Fig. 1; and

Fig. 4 is a section taken approximately on the line 4—4 of Fig. 1.

Referring to these drawings, 1 designates a hack saw blade on which are provided teeth 2, 3, 4, the teeth 2 and 3 being alternately offset as described in my said copending application and differing from the usual offsetting in that the portion of the blade carrying the teeth 2, 3, is provided with corrugations so that the metal of the teeth is substantially parallel to the depth of the blade, the teeth 2 being offset to one side of the blade, and the teeth 3 to the other side, and the cutting edges are substantially perpendicular to the depth of the blade.

These offset teeth 2, 3, are preferably arranged in groups at intervals along the length of the blade, and in the intermediate spaces there are provided teeth 4 which project straight down, in the plane of the blade, and consequently project below the cutting edges of the corrugated teeth by an amount indicated $h$ on Fig. 1. This result is brought about by reason of the fact that as the corrugations for the teeth 2, 3, are formed, the metal carrying the teeth being forced sidewise, is, as shown in Fig. 3, raised up slightly or fore-shortened by reason of the bend 5 in the metal, thus bringing the cutting edges of these corrugated teeth the distance $h$ above the cutting edges of the straight teeth 4.

The offset of the corrugations is preferably such that the thickness of the blade overall at the corrugated portions, does not exceed twice the thickness of the blade before corrugating, and the depth of the corrugations, measured in the same direction as the depth of the blade, is preferably slightly greater than the depth of a tooth, the elements of the surfaces of the corrugations being preferably kept parallel to the depth of the blade for a distance equal to or greater than the depth of a tooth.

The offset teeth are preferably formed in the corrugated portions at the part of the corrugations farthest from the longitudinal center line of the blade.

The straight teeth preferably lie all in the same plane, being the plane of the blade, so that as the saw is used, these teeth 4, projecting downward farther than the teeth of the corrugated portions, engage the work first, and cut a groove at the bottom of the kerf, relieving and lessening the work that the teeth in the corrugated portions must do in finishing the kerf and the side walls thereof.

The combination of these straight teeth, lying in the same plane, and projecting downward farther than the offset teeth, with the corrugated construction of the blade, the corrugated construction alternating with the straight construction so as to bring a plurality of teeth in the corrugated portions together, and then a plurality of straight teeth together, enables the saw to cut more rapidly, at the same time cutting smoothly, and freeing the kerf of the chips with all the facility of the construction described in my said copending application, and the lasting powers of the saw are increased by reason of the fact that the straight cutting teeth relieve a considerable portion of the work that is required to be done by the teeth in the corrugated portions.

Having now described my invention, I claim and desire to secure by Letter Patent:

A hack saw blade comprising portions having corrugations extending laterally of the blade parallel to the depth of the blade and of a depth greater than that of a tooth, teeth formed on the portions of said blade farthest offset having cutting edges perpendicular to the depth of the blade, and teeth formed on the portions of said blade intermediate of the corrugated portions, said latter teeth extending beyond the offset teeth as the latter are fore-shortened by the corrugating.

In testimony whereof I have signed my name to this specification.

AUSTIN M. LAWRENCE.